United States Patent [19]

Mishina et al.

[11] Patent Number: 5,333,774
[45] Date of Patent: Aug. 2, 1994

[54] VAPOR REFLOW SOLDERING APPARATUS

[75] Inventors: Haruo Mishina, Ushiku; Shinya Yamama, Abiko, both of Japan

[73] Assignee: Hitachi Techno. Engineering Co., Ltd., Tokyo, Japan

[21] Appl. No.: 31,878

[22] Filed: Mar. 16, 1993

[30] Foreign Application Priority Data

Mar. 16, 1992 [JP] Japan .................. 4-055797

[51] Int. Cl.⁵ ............................................ B23K 1/015
[52] U.S. Cl. ........................................ 228/46; 228/222; 228/234.2; 219/388
[58] Field of Search ............... 228/240, 242, 42, 46, 228/222, 234.2; 219/388

[56] References Cited

U.S. PATENT DOCUMENTS

| | | | |
|---|---|---|---|
| 3,773,260 | 11/1973 | Kunioka et al. | 228/46 X |
| 4,321,031 | 3/1982 | Woodgate | 219/388 X |
| 4,838,476 | 6/1989 | Rahn | 228/240 |
| 5,146,694 | 9/1992 | Mishina et al. | 34/78 |
| 5,156,325 | 10/1992 | Mishina et al. | 228/219 |

FOREIGN PATENT DOCUMENTS

| | | |
|---|---|---|
| 252671 | 11/1987 | Japan . |
| 270275 | 11/1987 | Japan . |
| 90361 | 4/1988 | Japan . |
| 264268 | 11/1988 | Japan . |
| 289566 | 11/1989 | Japan . |
| 47674 | 2/1991 | Japan . |
| 47891 | 1/1987 | Netherlands . |

*Primary Examiner*—Kenneth J. Ramsey
*Attorney, Agent, or Firm*—Antonelli, Terry, Stout & Kraus

[57] ABSTRACT

A vapor reflow soldering apparatus includes a unit for delivering an article processed to a vapor generating tank for generating saturated vapor of thermal medium, for allowing the article to be to come in contact with the saturated vapor, and for heating and melting solder of the article. A thermal medium recovery system collects thermal medium which flows in the article delivery path. There is also provided an arrangement for leading at least one part of exhaust gas containing mist from a recovery tank of the thermal medium recovery system for collecting and cooling thermal medium to the outlet-side delivery path for delivering the article. The exhaust gas with mist is blown off to the article being processed. The gas containing the mist is obtained by cooling the thermal medium in vapor phase state. The blown off gas containing mist to increases the cooling speed for the soldered part and the bonding strength, and reduces the consumption of thermal medium.

4 Claims, 5 Drawing Sheets

VAPOR REFLOW SOLDERING APPARATUS

BACKGROUND OF THE INVENTION

The present invention relates to a vapor reflow soldering apparatus and more particularly to a vapor fellow soldering apparatus which is suitable for high density packaging for soldering so-called flat package ICs having electrode terminals which are led flatly on each printed circuit board in four directions and resistor and capacitor surface mount devices.

Recently, electronic parts are packaged in high density increasingly on printed circuit boards. However, the soldering operation for bonding electronic parts such as semiconductors and devices to printed circuit boards is the last process of the line, so that the soldering art is assumed as a most important art of the line. Since it is necessary to increase the uniformity of temperature distribution in a furnace where the soldering operation is performed and to avoid overheat which is harmful for electronic parts, a vapor fellow soldering apparatus which uses vapor with high specific gravity to air as a thermal medium and heats an article to be processed using the latent heat of condensation is used recently.

This apparatus is, as indicated, for example, in Japanese Patent Laid-Open No. 63-90361, a soldering apparatus having a vapor generating tank for soldering a printed circuit board by passing it through saturated vapor of a thermal medium with high specific gravity to air as mentioned above.

A conventional typical vapor reflow soldering apparatus using a conveyor will be explained with reference to FIGS. 4 and 5.

FIG. 4 is a vertical sectional view of a conventional vapor reflow soldering apparatus and FIG. 5 is a sectional view taken on the A—A line shown in FIG. 4.

Figure 4:
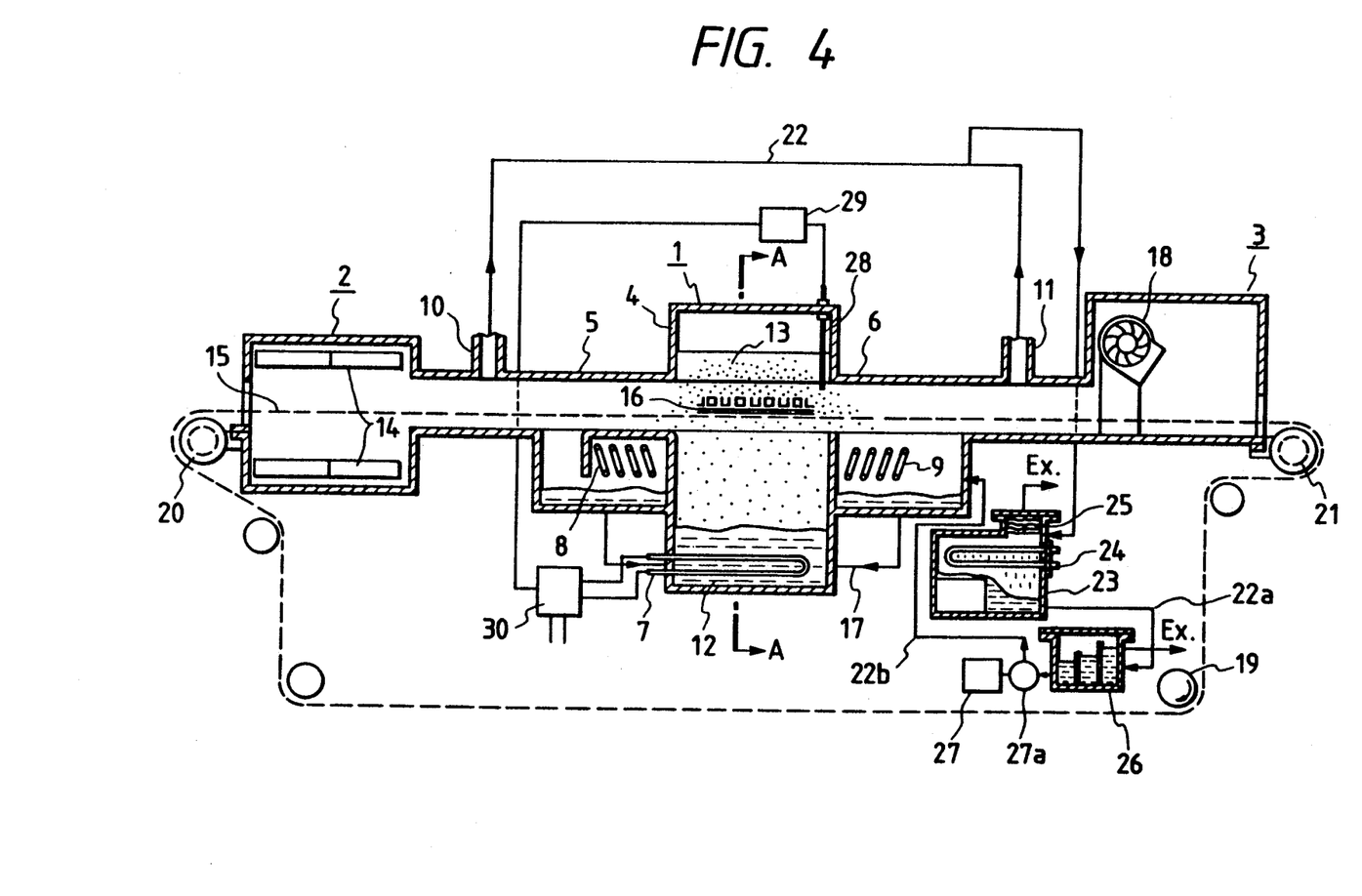
FIG. 4 is a vertical sectional view of a conventional vapor reflow soldering apparatus.

The apparatus shown in FIG. 4 has a reflow chamber 1 including a vapor generating tank 4, an inlet-side delivery path 5, an outlet-side delivery path 6, a heater 7, an inlet-side cooling coil 8, an outlet-side cooling coil 9, an inlet-side exhaust port 10, and an outlet-side exhaust port 11, a preheating chamber 2 including a preheater 14, a cooling chamber 3 including a cooling fan 18, a driving unit including a conveyor 15, a drive sprocket 19, an inlet-side sprocket 20, and an outlet-side sprocket 21, a thermal medium recovering system including a recovery tank 23, a water/acid remover 26, a controller 27 and a pump 27a, and a filtering system (not shown in the drawing) for removing flux which gets mixed in a thermal medium 12 in the vapor generating tank 4.

The operation of a conventional vapor reflow soldering apparatus which has the above structure will be explained hereunder.

Figure 5:
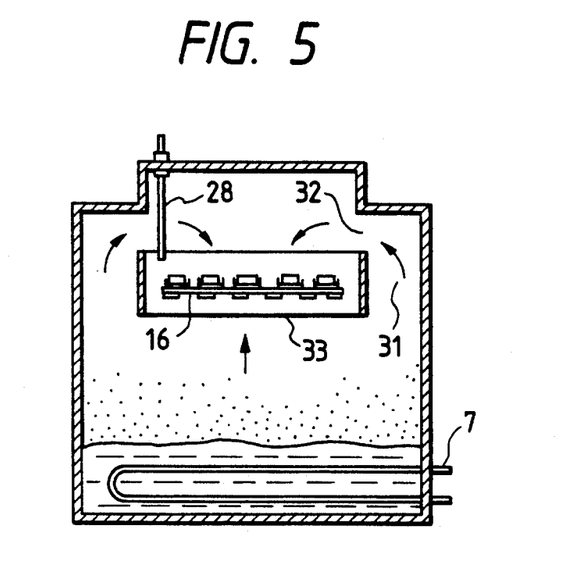
FIG. 5 is a sectional view taken on the A-A line shown in FIG. 4.

Saturated vapor 13 of the thermal medium 12 which is boiled and vaporized by the heater 7 immersed in the thermal medium 12 collected at the bottom of the vapor generating tank 4 moves up and is discharged from a side vapor outlet 32 leading to a side wall path 31 and from a lower vapor outlet 33 so as to heat an article 16 to be processed on the conveyor 15 as shown in FIG. 5. A part of the saturated vapor is condensed and liquefied, and drops, and is collected at the bottom of the vapor generating tank 4. The saturated vapor 13 which flows into the inlet-side delivery path 5 and the outlet side delivery path 6 is cooled and liquefied by the inlet side cooling coil 8 and the outlet-side cooling coil 9 and returned to the bottom of the vapor generating tank 4 via a return pipe 17.

A small amount of remaining vapor flows into the recovery tank 23 from the inlet-side exhaust port 10 and outlet-side exhaust port 11 via a pipe 22 and vapor which is adhered to and separated later from the article 16 to be processed flows into the recovery tank 23 from the outlet-side exhaust port 11 via the pipe 22. The above vapor is cooled by a cooling coil 24 in the recovery tank 23 and the thermal medium in mist phase state is acquired by a demister 25 for removing mist and dropped and collected at the bottom.

The collected thermal medium flows into the water-/acid remover 26 via a pipe 22a. The thermal medium is separated from water/acid by the water/acid remover 26 and the floated water/acid overflow. When the thermal medium collected at the bottom reaches a fixed amount, a controller 27 operates on the basis of a detection signal of a detection means such as a float switch and the thermal medium is returned to the vapor generating tank 4 via a pump 27a and a pipe 22b.

On the other hand, the article 16 to be processed which is heated by the preheater 14 and delivered into the reflow chamber 1 from the preheating chamber 2 by the conveyor 15 comes in contact with saturated vapor 13 and is heated. In the vapor generating tank 4, solder is heated and melted by the latent heat of condensation of the saturated vapor 13 and the article 16 is soldered. The article 16 to be processed is sent into the outlet-side delivery path 6, cooled gradually, sent into the cooling chamber 3, cooled furthermore by the cooling fan 18, and then transferred from the equipment.

The saturated vapor 13 in the vapor generating tank 4 is kept constant in temperature by controlling the power supplied to the heater 7 by a temperature sensor 28 which is movable inside the vapor generating tank 4 and a temperature controller 29 via a power regulator 30.

Exhaust gas which passes through the demister 25 of the recovery tank 23 may contain a small amount of thermal medium mist. Therefore, the thermal medium is acquired additionally by a processor so as to acquire and collect thermal medium in fine mist phase state and exhaust gas is discharged into the atmosphere after the thermal medium is fully removed.

The following problems are imposed in the aforementioned vapor reflow soldering apparatus.

According to the structure that the saturated vapor 13 which is a heat source in the outlet-side delivery path 6 is reduced in volume by condensation by the outlet-side cooling coil 9 and cooled, the cooling speed for the article 16 to be processed is slow compared with a hot air reflow soldering apparatus for blowing off hot air and the bonding strength of the soldered part is low.

The vapor reflow soldering apparatus indicated in U.S. Pat. Nos. 5,146,694 and 5,156,325 (the inventors of both patents are the same as the inventors of the present invention, so that these patents are not prior arts for the present application). also has the above problems.

SUMMARY OF THE INVENTION

An object of the present invention is to provide a vapor fellow soldering apparatus, which is free from the problems inherent in the aforementioned prior art and wherein the cooling speed until the soldered part of an article to be processed solidifies is increased and the bonding strength is high. Another object of the present invention is to provide a vapor reflow soldering apparatus wherein thermal medium contained in exhaust gas and thermal medium adhered to the article to be processed are collected, and exhaust gas containing thermal medium is reused to cool the article to be processed, and the consumption of thermal medium is reduced, and the cost is decreased. A further object of the present invention is to provide a vapor reflow soldering apparatus wherein the soldered part is cooled when the article to be processed is delivered and the part to be soldered is sufficiently heated so as to increase the soldering reliability.

To accomplish the above objects, the vapor reflow soldering apparatus of the present invention for delivering an article to be processed to a vapor generating tank for generating saturated vapor of thermal medium and allowing the article to be processed to come in contact with the saturated vapor so as to heat and melt solder of the article to be processed for soldering the article is structured such that a means for blowing off gas containing mist, which is obtained by cooling thermal medium in vapor phase state, to the article to be processed on the outlet-side delivery path for the article to be processed of the above vapor generating tank is installed.

According to the above soldering apparatus of the present invention, by installing a thermal medium recovery system for collecting thermal medium flowing into the delivery path for the article to be processed and by installing a means for leading at least one part of exhaust gas in a recovery tank for collecting and cooling thermal medium in the above thermal medium recovery system to the above delivery path for the article to be processed and for blowing it off to the article to be processed, the collected thermal medium can be reused so as to cool the article to be processed.

By installing a blow-off pipe for blowing off gas containing cooled thermal medium in vapor phase state into the outlet side delivery path on the downstream side of the above vapor generating tank, mounting an open-close valve to the blowoff pipe, and installing a control means for opening the above open-close valve when the article to be processed passes in opposition to the opening of the above blow-off pipe, the soldering reliability can be increased. In this case, the gas containing cooled thermal medium in vapor phase state which is blown off from the blow-off pipe may be at least one part of exhaust gas which is collected from the recovery tank for collecting and cooling thermal medium and led.

As mentioned above, according to the present invention, gas containing mist obtained by cooling thermal medium in vapor phase state is blown off to the article to be processed, so that the heat of vaporization of mist of thermal medium and kinetic energy of gas increase and the heat of the soldered part is effectively removed. Hot thermal medium in vapor phase state which is adhered to the article to be processed is blown off by an air current which is blown off, so that the heat insulating effect of the hot thermal medium in vapor phase state for the article to be processed is reduced and the article to be processed is cooled quickly. The strength of the soldered part is increased and the reliability is improved.

By blowing off thermal medium adhered to the article to be processed by blowing off gas, collecting it by the recovery tank, and reusing it, the thermal medium is prevented from scattering and losing outside the equipment together with the article to be processed. Therefore, the present invention is economical. Furthermore, by using at least one part of exhaust gas from the recovery tank to cool the article to be processed, the power and labor for producing gas containing cooled thermal medium in vapor phase state can be saved. Therefore, the present invention is also economical in this regard.

Furthermore, by blowing off gas used for forced cooling only when the article to be processed passes through a special location (a location opposite to the opening of the blow-off pipe whereto at least one part of exhaust gas collected from the recovery tank is led) of the delivery path, the disturbance of vapor caused by the gas in the vapor generating tank is minimized, and the article to be processed is heated effectively, and solder is melted sufficiently, so that the solder can be melted and solidified quickly and the soldering reliability is increased.

Fluoric inert liquid is generally used as a thermal medium mentioned above. As gas wherein mist obtained by cooling thermal medium in vapor phase state (hereinafter abbreviated to thermal medium mist) is contained, air is generally used. Any gas which does not affect the article to be processed, for example, nitrogen gas may be used. However, as long as exhaust gas from the thermal medium recovery tank is used as gas containing thermal medium mist, air is used as gas mentioned above. When blow-off gas contains even a small amount of thermal medium mist, a reasonable effect corresponding thereto can be produced. Even if the content of thermal medium mist in blow-off gas is, for example, 0.1 vol%, the effect of the present invention can be recognized. As long as thermal medium can exist as mist, any high content of the thermal medium can be employed. The cooling temperature of thermal medium in vapor phase state for obtaining thermal medium mist is at most the boiling point of the thermal medium. When, for example, FC70 (trade mark of Sumitomo 3M Co., Ltd. in Japan) is used as a thermal medium, it is cooled to at most 215° C.

The blow-off port of gas containing thermal medium mist is installed in the outlet-side delivery path. The actual position of the blow-off port may be any position between the vapor generating tank and cooling chamber (the position of the exhaust port is excluded). However, to keep blown-off thermal medium mist inside the reflow chamber, it is desirable to install the blow-off port before the exhaust port. To keep the behavior of vapor in the vapor generating tank away from disturbance, it is desirable to install the blow-off port in the neighborhood of the exhaust port. When installing the blow-off port behind the exhaust port, it is desirable to modify the blow-off port and/or exhaust port.

DESCRIPTION OF THE PREFERRED EMBODIMENTS

Next, the embodiments of the present invention will be explained with reference to FIGS. 1 to 3.

Embodiment 1

Figure 1:
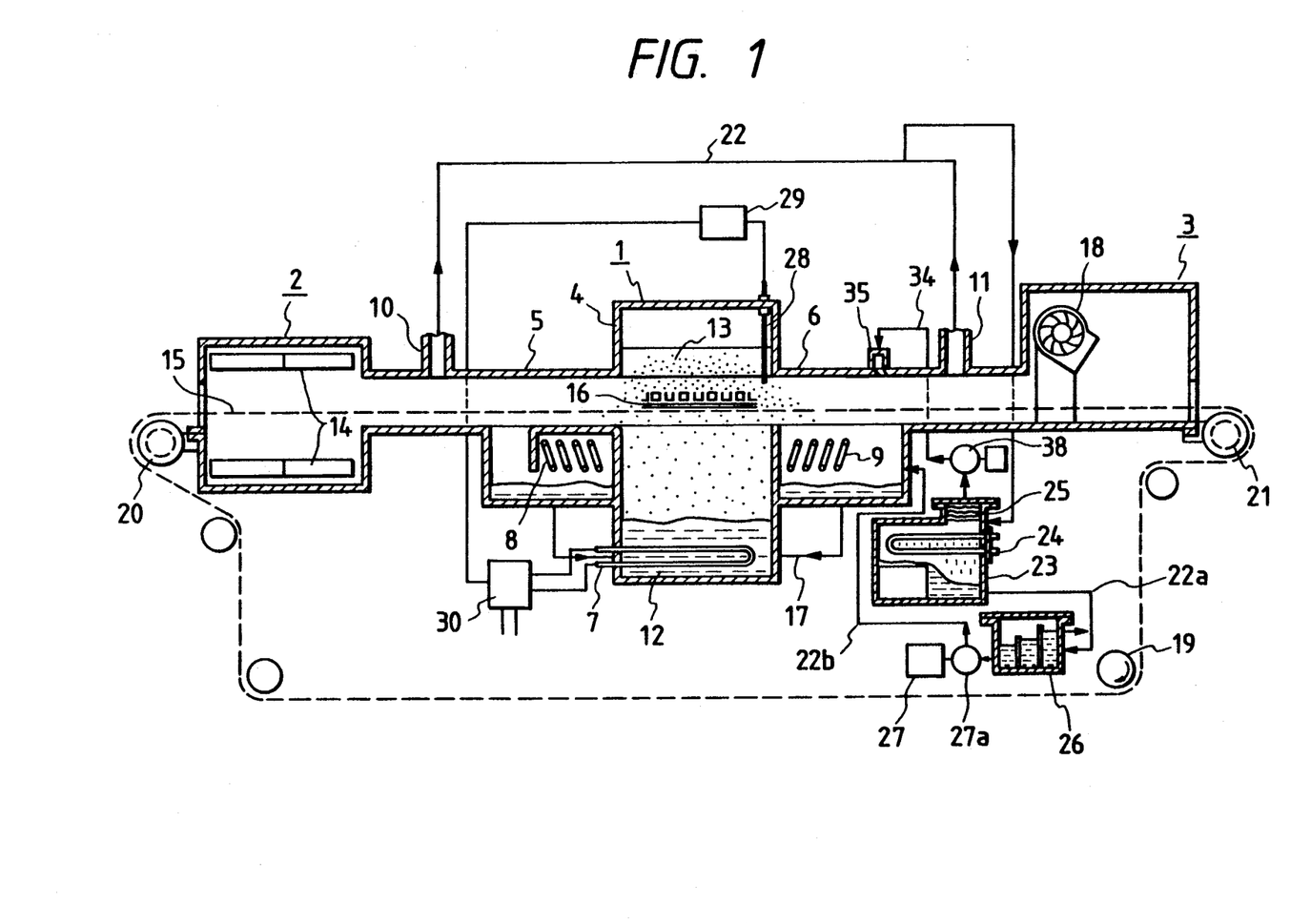
FIG. 1 is a vertical sectional view of a vapor fellow soldering apparatus relating to an embodiment of the present invention.

FIG. 1 is a vertical sectional view of a vapor fellow soldering apparatus relating to an embodiment of the present invention. The numerals shown in FIGS. 1 to 3 which are the same as those shown in FIG. 4 indicate the same parts as those shown in FIG. 4 and those in the prior art. Therefore, general explanation of the operation will be omitted.

A difference between the embodiment shown in FIG. 1 and the prior art is that a means for blowing off gas containing mist obtained by cooling thermal medium in vapor phase state to an article to be processed on the delivery path for the article to be processed of a vapor generating tank is installed.

The vapor reflow soldering apparatus shown in FIG. 1 is of a conventional structure that has a reflow chamber 1 including a vapor generating tank 4, an inlet-side delivery path 5, an outlet-side delivery path 6, a heater 7, an inlet-side cooling coil 8, an outlet-side cooling coil 9, an inlet-side exhaust port 10, and an outlet-side exhaust port 11, a preheating chamber 2 including a preheater 14, a cooling chamber 3 including a cooling fan 18, a driving unit including a conveyor 15, a drive sprocket 19, an inlet-side sprocket 20, and an outlet-side sprocket 21, a control system including a temperature sensor 28, a temperature controller 29, and a power regulator 30, and a thermal medium recovering system including a recovery tank 23, a water/acid remover 26, a controller 27, and a pump 27a.

In addition to the above conventional structure, a means having an exhaust pipe 34 relating to a blow-off pipe, a blow-off port 35 relating to the opening of the blow-off pipe, and an exhaust fan 38 between the top of a demister 25 of the recovery tank 23 of the above thermal medium recovery system and the outlet-side delivery path 6, for blowing off the gas (exhaust gas) containing mist, which is obtained by cooling thermal medium in vapor phase state is installed. The blow-off port 35 is structured so as to blow off exhaust gas to the article 16 to be processed almost evenly in full width. When blowing off exhaust gas only to a specified area of the article to be processed, it is desirable to change the design of the opening position of the blow-off port 35.

The operation of the vapor reflow soldering apparatus of this embodiment having the above structure will be explained hereunder.

When the equipment is started, power is supplied to the preheater 14 and heater 7. Thermal medium 12 collected at the bottom of the vapor generating tank 4 is heated by the heater 7 and vaporized immediately because the heat of vaporization is about 1/25 of that of water and saturated vapor 13 is generated. The saturated vapor 13 moves up in the vapor generating tank 4 and a part of it flows out from a lower vapor outlet 33 and the residue flows out from an upper vapor outlet 32 so as to secure the vapor surface necessary for solder reflow for the article 16 to be processed as shown in FIG. 5.

The saturated vapor 13 which flows through the inlet-side delivery path 5 and outlet-side delivery path 6 from the vapor generating tank 4 is cooled and liquefied by the inlet-side cooling coil 8 and outlet-side cooling coil 9 and returned to the bottom of the vapor generating tank 4 via a return pipe 17.

The part of the saturated vapor 13 which remains in the inlet-side delivery path 5 and outlet-side delivery path 6 is sent to the recovery tank 23 via the inlet-side exhaust port 10, outlet-side exhaust port 11, and pipe 22 and condensed and liquefied by a cooling coil 24 in the recovery tank 23. The thermal medium in mist phase state is acquired by the demister 25, drops together with water which is produced by condensing moisture in the atmosphere, and is collected at the bottom of the recovery tank 23.

The thermal medium containing water is sent to the water/acid remover 26 from the bottom of the recovery tank 23, separated from water/acid by the difference in specific gravity, and returned to the bottom of the outlet-side cooling coil 9 by the pump 27a once again. Water/acid overflow by level control and are discharged outside. Water/acid is water which comes in contact with the thermal medium, contains a very small amount of hydrofluoric acid, and is extremely corrosive.

According to this embodiment, FC-70 is used as a thermal medium. However, thermal media available on the market such as 5311 and 5312 (trade names of Sumitomo 3M Co., Ltd.) and IL-310 and IL-260 (trade names of Tokuyama Soda Co., Ltd.) may be used.

The total amount of exhaust gas from the recovery tank 23 which is discharged conventionally into the atmosphere is led to the blow-off pipe 35 above the outlet-side delivery path 6 via the exhaust pipe 34 and exhaust fan 38.

Not all the thermal medium in mist phase state can be caught by the demister 25 and a small amount of thermal medium is led to the outlet-side delivery path 6 from the blow-off port 35 by the exhaust fan 38 together with exhaust gas.

The thermal medium in mist phase state is cooled by the cooling coil 24.

The article 16 to be processed which is sent to the preheating chamber 2 by the conveyor 15 is preheated to a predetermined temperature (140° to 160° C.), heated up to the solder melting temperature in the reflow chamber 1, and cooled by exhaust gas containing thermal medium at a low temperature from the blow-off port 35 in the outlet-side delivery path 6 so as to blow off thermal medium condensed on the article 16 to be processed. The article 16 is cooled furthermore by the cooling fan 18 in the cooling chamber 3 and taken out of the equipment.

The article 16 to be processed is blown off with cold exhaust gas when it passes under the blow-off port 35 and cooled quickly down to at least the solder solidification point. In this case, the kinetic energy of exhaust gas is increased because it contains mist, and an air current whose flow rate is not decreased. The heat of the soldered part is taken by the heat of vaporization of the thermal medium when the thermal medium in mist phase state comes in contact with the article 16 to be processed. The hot thermal medium adhered to the article 16 to be processed is removed by exhaust gas with high kinetic energy, so that the article 16 to be processed including the soldered part is cooled quickly.

The thermal medium which is separated from the article 16 to be processed by doing this is sent to the recovery tank 23 by the outlet-side exhaust port 11 on the downstream side, so that the amount of thermal medium which is discharged from the equipment together with the article 16 to be processed is extremely reduced, and the collection rate of thermal medium is increased, and the production cost of the article 16 to be processed can be decreased, and the profitability is increased.

Since cold exhaust gas is used, the cost and labor for producing cold gas which is blown off to the article 16 to be processed can be saved and the structure is economical also in this respect.

The blow-off port 35 may be installed on the delivery side of the outlet-side exhaust port 11. The blow-off port 35 may be installed on the upper and lower sides of the outlet side delivery path 6.

Furthermore, if cold gas can be obtained from the outside of the equipment, it may be added to some part of the exhaust pipe 34 so as to blow off colder exhaust gas to the article to be processed.

Embodiment 2

Next, the second embodiment of the present invention will be explained with reference to FIG. 2. FIG. 2 is a vertical sectional view of a vapor reflow soldering apparatus relating to another embodiment of the present invention. The numerals shown in the drawing which are the same as those shown in FIG. 1 indicate the same parts as those shown in the aforementioned embodiment. Therefore, explanation of the parts will be omitted. A difference between the embodiment shown in FIG. 2 and the embodiment shown in FIG. 1 is that a part of exhaust gas is led to before the outlet-side exhaust port 11 and blown off to the article 16 to be processed from above without all exhaust gas from the recovery tank 23 being used.

Figure 2:
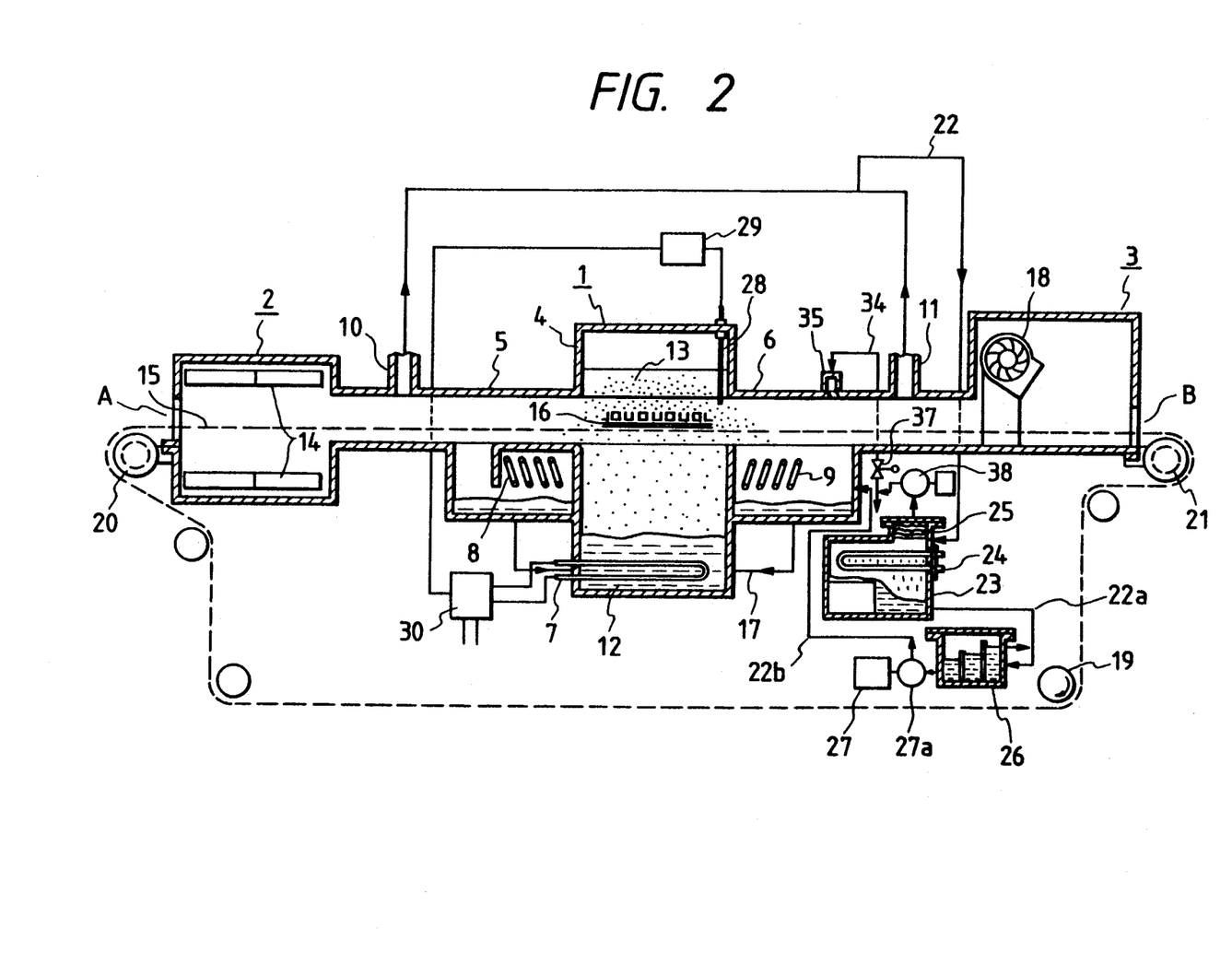
FIG. 2 is a vertical sectional view of a vapor reflow soldering apparatus relating to another embodiment of the present invention.

According to the vapor reflow soldering apparatus shown in FIG. 2, an electromagnetic valve 37 relating to the open close valve is installed at some part of the exhaust pipe 34 and the upstream side of the electromagnetic valve 37 of the exhaust pipe 34 is open to air. Therefore, when the electromagnetic valve 37 is operated and closed, a part of exhaust gas from the recovery tank 23 is led to the outlet side delivery path 6 from the blow-off port 35 via the electromagnetic valve 37. It is desirable to discharge the remaining exhaust gas via the thermal medium acquisition means before discharging it directly into the atmosphere.

Since the remaining exhaust gas is discharged into the atmosphere little by little from the exhaust pipe 34, the pressure in the equipment becomes negative. Therefore, air is sucked in from the inlet A and outlet B for the article 16 to be processed and an air current toward the inlet-side exhaust port 10 and outlet-side exhaust port 11 is formed. This current prevents thermal medium vapor from being sent to the preheater 14 and generating a harmful substance by decomposition by heating. The current also prevents thermal medium vapor from discharging into the atmosphere from the inlet A and outlet B, so that the collection rate of thermal medium is increased further.

According to this embodiment, as mentioned above, a vapor reflow soldering apparatus can be provided wherein thermal medium in exhaust gas and thermal medium adhered to the article to be processed are collected, and exhaust gas including thermal medium is reused to cool the article to be processed, and the consumption of thermal medium is reduced, and the profitability is increased

Embodiment 3

Next, the third embodiment of the present invention will be explained with reference to FIG. 3.

Figure 3:
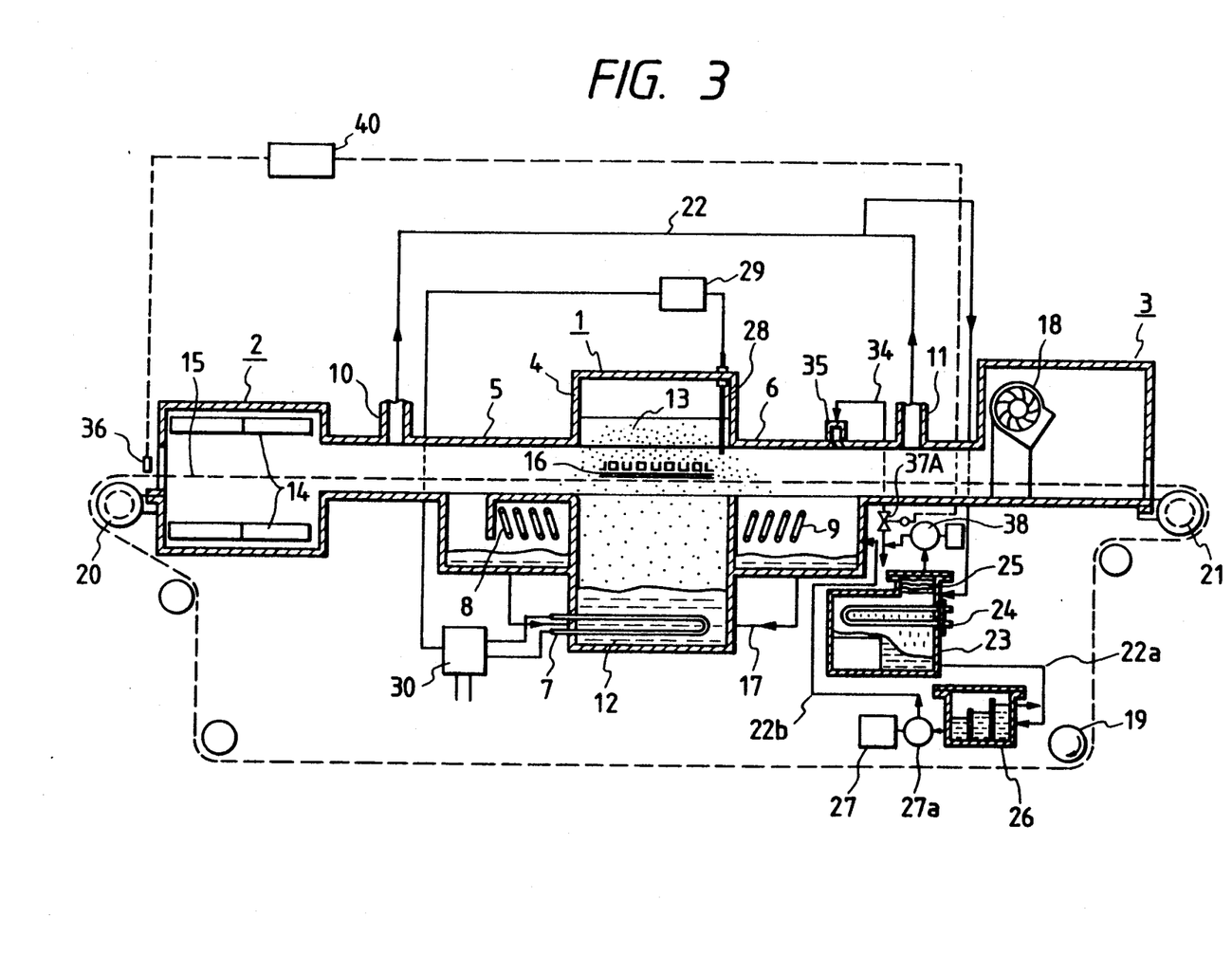
FIG. 3 is a vertical sectional view of a vapor reflow soldering apparatus relating to a further embodiment of the present invention.

FIG. 3 is a vertical sectional view of a vapor reflow soldering apparatus relating to a further embodiment of the present invention. The numerals shown in the drawing which are the same as those shown in FIG. 1 indicate the same parts as those shown in the aforementioned embodiment. Therefore, explanation of the parts will be omitted.

A difference between the embodiment shown in FIG. 3 and the embodiment shown in FIG. 1 is that a control means is provided for blowing off exhaust gas to the article 16 to be processed when it passes under the blow-off port 35.

According to the vapor reflow soldering apparatus shown in FIG. 3, an article sensor 36 is installed before the preheating chamber 2 of the embodiment shown in FIG. 2 and an electromagnetic valve 37A which opens or closes according to a signal from the above article sensor 36 is installed at the outlet of the recovery tank 23.

When the article sensor 36 detects the article 16 to be processed and the length thereof, a controller 40 calculates the time required for the article 16 to be processed to reach under the blow-off port 35 (distance from the sensor to the blow-off port/conveyor speed) and the blowing time and allows the electromagnetic valve 37A to operate the arrival time behind, to keep open until the article 16 to be processed passes under the blow-off port 35, and to blow off a part of exhaust gas to the article 16 to be processed so as to promote cooling of the article.

By doing this, the existing area of the saturated vapor 13 in the reflow chamber 1 is disturbed little by an exhaust gas current blown off from the blow-off port 35, so that the article 16 to be processed passing here comes in full contact with the saturated vapor 13 and is heated surely, and the solder is melted completely, and the soldering reliability is increased.

It is possible to receive information on the article 16 to be processed from the prestage unit and to open or close the electromagnetic valve 37A on the basis of this information in the same way as mentioned above without the installation of the article sensor 36.

The article sensor 36 may be installed at an optional location in the equipment, for example, at the entrance of the outlet-side delivery path 6 in the neighborhood of the blow-off port 35.

Furthermore, the exhaust gas blow-off control system of the article sensor 36, electromagnetic valve 37A, and controller 40 which is shown in FIG. 3 may be applied to a case that the total amount of exhaust gas is blown off as shown in the embodiment in FIG. 1. In this case, when the electromagnetic valve is closed to the blow-off port, exhaust gas is discharged into the atmosphere in the same way as with the conventional example shown in FIG. 4. Therefore, a 3-way valve is used as an electromagnetic valve in this case.

Even if thermal medium in mist phase state is caught perfectly by the demister 25 of the recovery tank 23 and only cold exhaust gas is blown off from the blow-off port 35 in one of the embodiments shown in FIGS. 1 to 3 or a modification example or application example thereof, it is within the range of the present invention.

As obvious from the aforementioned embodiments, according to the vapor reflow soldering apparatus of the present invention, the cooling speed until the soldered part of an article to be processed is solidified is increased, and the bonding strength is increased, and thermal medium contained in exhaust gas and thermal medium adhered to the article to be processed are collected, and the exhaust gas containing thermal medium can be reused so as to cool the article to be processed. Therefore, the consumption of thermal medium can be reduced, and the profitability is increased, and the soldered part is heated sufficiently by blowing off gas containing thermal medium mist to the article to be processed only when the article is delivered, and the soldering reliability is increased further.

What is claimed is:

1. A vapor reflow soldering apparatus having means for delivering an article to be processed to a vapor generating tank for generating saturated vapor of thermal medium, means for allowing the article to be processed to come in contact with the saturated vapor, and means for heating and melting solder of the article to be processed so as to solder the article, and wherein said vapor reflow soldering apparatus further comprises means for blowing a as containing mist, which is obtained by cooling the thermal medium in vapor phase state, on the article to be processed in an outletside delivery path for delivering the article to be processed from said vapor generating tank, so that said gas containing mist rapidly cools the article by the heat of vaporization of the mist when the air containing the cooled mist is blown on the article.

2. A vapor reflow soldering apparatus according to claim 1, further comprising a thermal medium recovery system for collecting said thermal medium which flows in a delivery path for delivering the article to be processed, said recovery system including cooling means for cooling the thermal medium in vapor phase state, and said gas containing the mist being at least one part of the exhaust gas cooled in said thermal medium recovery system by said cooling means.

3. A vapor reflow soldering apparatus according to claim 2, wherein a blow-off pipe for blowing said gas containing mist on said article is provided in said outletside delivery path and said blow-off pipe has an open-close valve.

4. A vapor reflow soldering apparatus according to claim 3, further comprising a control means for opening said open-close valve when the article to be processed passes the location opposite to the opening of said blow-off pipe.

* * * * *